United States Patent
Ueda et al.

(10) Patent No.: US 6,728,481 B2
(45) Date of Patent: Apr. 27, 2004

(54) APPARATUS PROVIDED WITH IMAGE BLUR PREVENTION FUNCTION

(75) Inventors: Toshiharu Ueda, Tokyo (JP); Yasuhiro Harada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/214,886

(22) Filed: Aug. 8, 2002

(65) Prior Publication Data

US 2003/0035651 A1 Feb. 20, 2003

(30) Foreign Application Priority Data

Aug. 16, 2001 (JP) .......................... 2001-246942

(51) Int. Cl.[7] .................. G03B 17/00; G03B 7/26
(52) U.S. Cl. ......................... 396/55; 396/303
(58) Field of Search ................. 396/52, 55, 301, 396/303; 348/208.99

(56) References Cited

U.S. PATENT DOCUMENTS

| 5,732,291 A | * | 3/1998 | Ohishi .......................... 396/55 |
| 6,256,457 B1 | * | 7/2001 | Miyamoto et al. ............ 396/52 |
| 6,505,000 B2 | * | 1/2003 | Kitani .......................... 396/52 |

* cited by examiner

Primary Examiner—Russell Adams
Assistant Examiner—Arthur A Smith
(74) Attorney, Agent, or Firm—Robin, Blecker & Daley

(57) ABSTRACT

There is provided an apparatus provided with an image blur prevention function, including: a blur correction driving means for performing correction of image blur; an actuator separate from the blur correction driving means, consuming energy of the actuator changing depending on time; a power supply for supplying energy to the blur correction driving means and the actuator; and a variable circuit for changing an energy supply pattern in supplying energy to the blur correction driving means by the power supply before or after consuming energy of the actuator changes.

10 Claims, 10 Drawing Sheets

APPARATUS PROVIDED WITH IMAGE BLUR PREVENTION FUNCTION

BACKGROUND OF THE INVENTION

1. Field of the Invention

The present invention relates to improvement of an optical electronic apparatus equipped with an image blur prevention function suitable for a camera, a digital camera and the like.

2. Related Background Art

In recent years, a zooming function is generally used in optical electronic apparatuses such as a silver salt camera, a digital camera and a video camera. In particular, an apparatus capable of performing high-magnification photographing (image recording) has become the mainstream.

In addition, an optical electronic apparatus with an image blur prevention function is generally used in order to solve a problem that image quality is significantly affected by a subtle movement (hand vibration) of a photographer as magnification is made higher.

As this image blur prevention function, there are various systems such as an electronic system mainly adopted in a video camera and the like and an optical system mainly adopted in a silver salt camera, a digital camera and the like.

Among the various systems of the image blur prevention function, a most generally used optical image blur prevention function is for driving a blur correction optical system (hereinafter referred to as shift lens), which is an element of an image blur prevention system included in a part of a photographing optical system, based on an output of vibration detecting means (vibration gyro, etc.) installed in a housing of an optical electronic apparatus such as a camera to reduce image blur on an image pickup surface of a film (or CCD, etc.) during an exposure operation (or image recording operation), that is, while a shutter is driven (open).

A system is often used which performs control of the above-mentioned shift lens by a permanent magnet adhered to the shift lens and a coil (electromagnet) of a camera main body or the like, which is installed in a position opposite the permanent magnet, to adjust a magnetic force to be generated and control an amount of movement of the shift lens according to an amount of energization to the coil.

It is preferable to drive the shift lens by controlling an electric current to the coil. However, since the amount of movement of the shift lens should be changed according to an amount of vibration, "Pulse Width Modulation (hereinafter referred to as PWM) control" in accordance with a voltage is often performed in order to actually drive the shift lens with good follow-up ability. Voltage detecting means for judging whether or not a voltage capable of driving an electronic apparatus is present is driven in advance, and a reference of PWM control that is a drive pattern of the shift lens is generally determined based on a result of voltage detection.

Moreover, methods of controlling an optical image blur prevention function are roughly divided into a method of performing "feedback control" that realizes an image blur prevention effect by recognizing an absolute position of the shift lens and moves the shift lens to a position according to an amount of vibration and a method of "open control" that always performs control of the shift lens according to an amount of vibration as driving from an initial position without a position detecting mechanism of the shift lens itself.

Since the above-mentioned "feedback control" can recognize an absolute position of the shift lens, it becomes possible to judge whether or not the image blur prevention effect is realized or to detect a failure of the image blur prevention system (disconnection, etc.). Thus, a degree of completion of the system is high. However, on the other hand, a sensor for detecting a shift lens position (PSD, etc.) is required. Therefore, the "open control" system is more advantageous in terms of space and costs.

There is a tendency of "miniaturizing" an apparatus which attaches importance to portability as another stream in the optical electronic apparatus market. Thus, a power supply such as a battery used in the apparatus tends to be also miniaturized and made smaller in capacity. As a result, energy saving of the entire apparatus has to be realized. Therefore, in order to prevent energy from being used more than needed, control for switching an energization current during driving is performed for an actuator that consumes a relatively large amount of energy.

Figure 9:
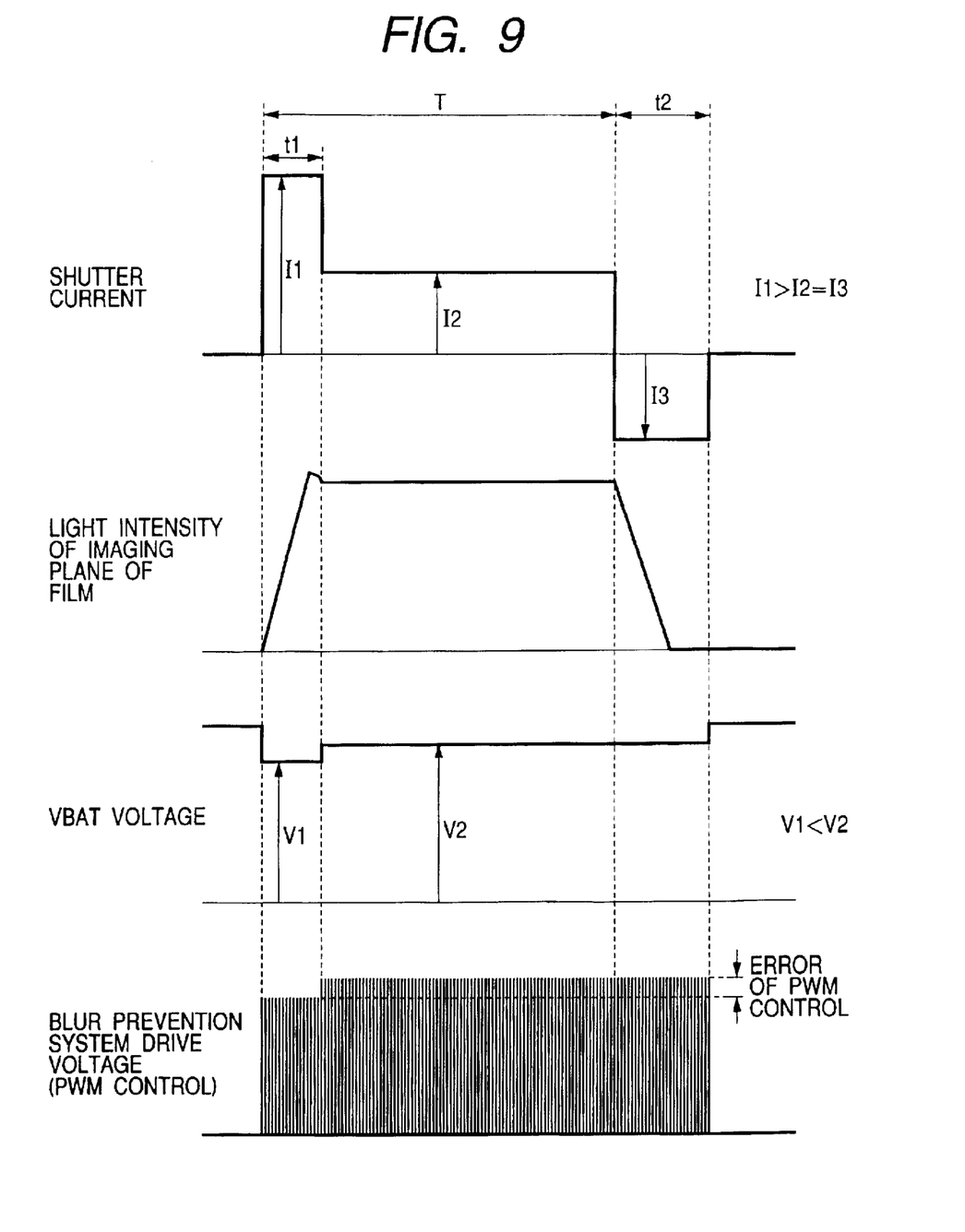
FIG. 9 is a chart showing an example of current and voltage waveforms at the time of a photographing operation of an optical electronic apparatus equipped with a general image blur prevention function.

More specifically, for example, as shown in FIG. 9, a large amount of energization current (consuming energy) is required (I1) in time (t1) from a closed state to a fully opened stable state for driving of a shutter (shutter also functioning as a stop) of a compact camera or the like. However, holding of the fully opened state (T-t1) and a closing operation from the fully opened state (t2) can be executed with a small amount of energization current (I2, I3). Thus, consuming energy (energization current) of the actuator (shutter) during exposure operation is often varied.

In addition, from a viewpoint of "miniaturization", if the image blur prevention function is provided, "open control" is often used as control of the image blur prevention system. Conventionally, since a drive pattern (e.g., PWM reference voltage) of the image blur prevention system (shift lens, etc.) is determined to be one in advance, if consuming energy of the actuator varies during driving of the image blur prevention system, energy (voltage) that can be used for the image blur prevention system varies. Thus, there is possibility that the image blur prevention system cannot operate with a desired amount of driving and an image blur prevention effect is reduced despite the fact that the image blur prevention system is driven with a planned drive pattern.

Figure 10:
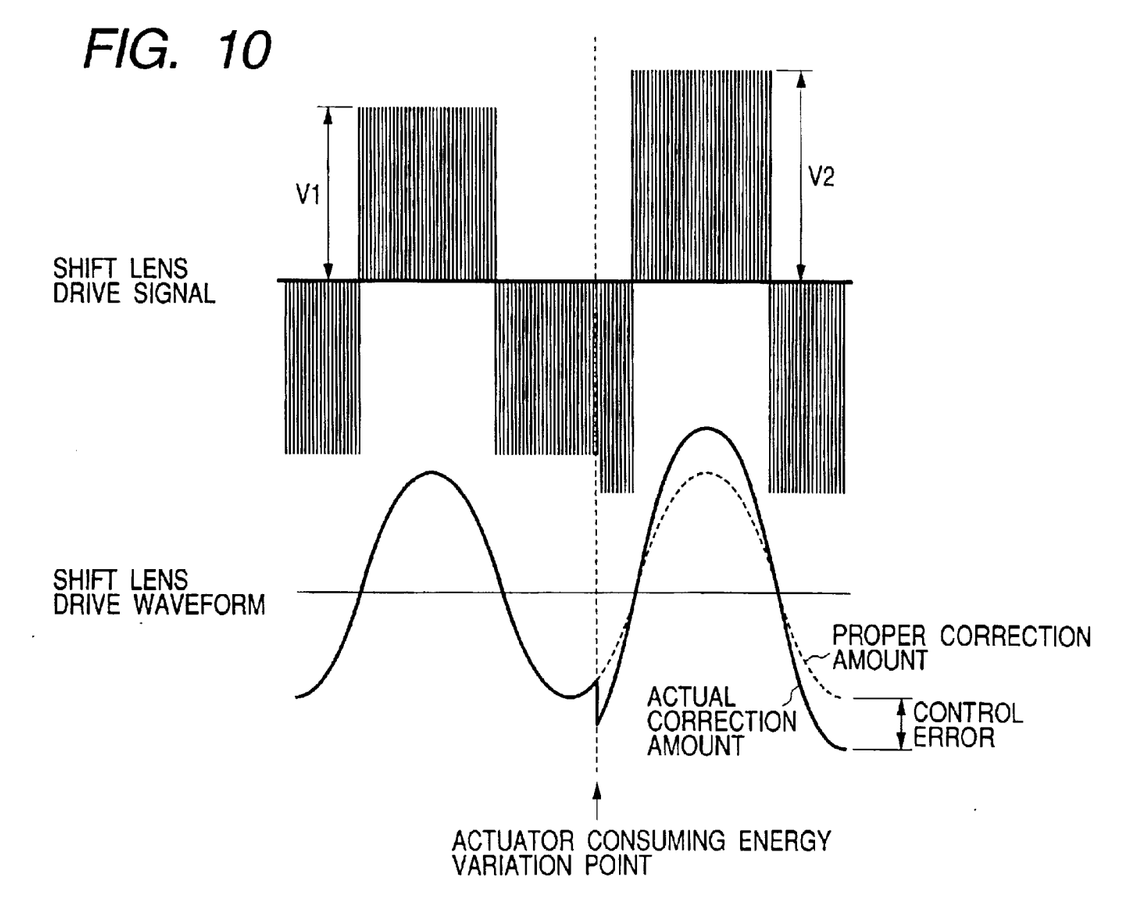
FIG. 10 is a chart showing an example of drive pattern change of an image blur prevention system (shift lens) of an optical electronic apparatus equipped with a conventional image blur prevention function.

A specific example is shown in FIG. 10.

Given that an optical electronic apparatus vibrated at a predetermined frequency is subject to the PWM control for a shift lens so as to correct the vibration, as long as a proper drive pattern (driving signal—amount of shift lens movement) of the shift lens is set at a voltage V1 before consuming energy of an actuator varies, shift lens driving with proper vibration suppression can be performed until consuming energy of the actuator is varied.

However, if consuming energy of the actuator is varied (reduced) and the shift lens is controlled with the same drive pattern as that at time V1 at a stage where a voltage that can be used for driving shift lens reaches V2, an actual correction amount (shift lens driving amount) becomes larger than a proper correction amount. Thus, a control error (correction error) occurs, and a situation arises in which an image blur prevention effect is reduced despite the fact that the image blur prevention system is actuated.

If control of the image blur prevention system is the "feedback control" system, it is possible to recognize reduction of the image blur prevention effect to perform self correction. However, in the "open control" system, it is difficult to perform the self correction.

As a measure for dealing with the above-mentioned problem, Japanese Patent Application Laid-Open No.

7-295001 proposes to repeat a voltage detecting operation even during an exposure operation to perform shift lens driving based on a result of the detecting operation.

However, it takes time for calculation as a sequence to repeat voltage detection during an exposure operation as in the above-mentioned proposal. Thus, it is likely that temporal delay occurs from the time of hand vibration until the shift lens is driven, and controllability and effects as an image blur prevention system are reduced by half.

SUMMARY OF THE INVENTION

The present invention has been devised in view of the above and other drawbacks, and therefore it is an object of the present invention to provide an optical electronic apparatus equipped with an image blur prevention function with which a desired image blur prevention effect can be realized even if an energy saving operation required for miniaturizing the apparatus is performed.

According to the present invention, there is provided an apparatus or a camera provided with an image blur prevention function, characterized by comprising: a blur correction driving means for performing correction of image blur; an actuator separate from the blur correction driving means, consuming energy of the actuator changing depending on time; a power supply for supplying energy to the blur correction driving means and the actuator; and a variable circuit for changing an energy supply pattern in supplying energy to the blur correction driving means by the power supply before or after consuming energy of the actuator changes.

Particularly, in the apparatus, the blur correction driving means is controlled to be driven by pulse width modulation control and the variable circuit changes a pulse width.

Also, in the apparatus, the actuator is controlled by variation in current of the power supply.

Further, the apparatus includes: an image receiving medium for receiving a subject image; and a shutter member for changing an amount of light reaching the image receiving medium, and in the apparatus, the actuator corresponds to the shutter member.

Further the apparatus includes optical means for forming an optical image of a subject, and in the apparatus the blur correction driving means drives at least a part of optical units constituting the optical means.

Further, the apparatus includes a voltage detection circuit for detecting a voltage of the power supply, and in the apparatus the voltage detection circuit detects a voltage in a state in which energy is supplied to the actuator.

Further characteristics of the present invention will be apparent from the following description and the drawings.

DETAILED DESCRIPTION OF THE PREFERRED EMBODIMENTS

The present invention will be hereinafter described in detail based on illustrated embodiments.

First Embodiment

A first embodiment of the present invention will be described with reference to FIGS. 1 to 6.

Figure 1:
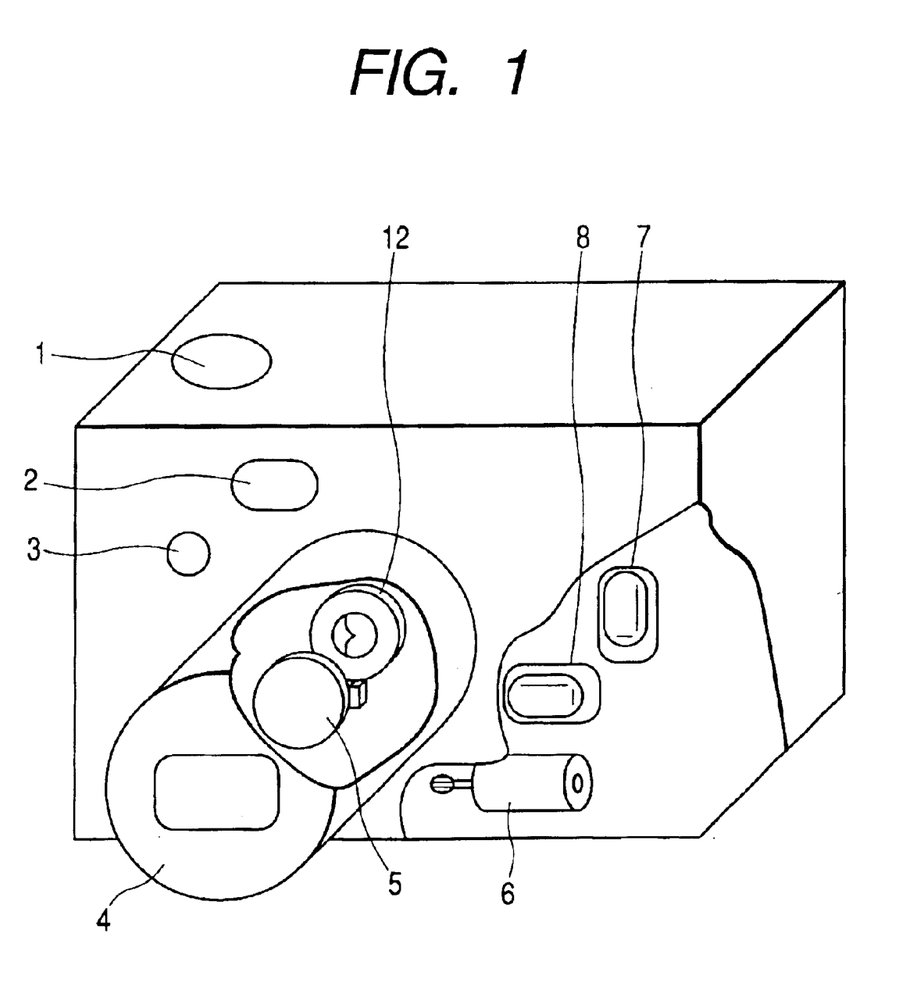
FIG. 1 is a perspective view showing a schematic structure of a camera system in a first embodiment of the present invention.

FIG. 1 is a perspective view showing a schematic structure of a camera that is an optical electronic apparatus equipped with an image blur prevention function in accordance with the first embodiment of the present invention.

In the figure, reference numeral 1 denotes a two-stage switch functioning as photographing information collection start instructing means (switch SW1) and exposure start instruction means (switch SW2); 2, a distance measurement (AF) unit for performing a well-known distance measurement operation when the switch SW1 is operated; 3, a light measurement (AE) unit for performing a well-known light measurement operation when the switch SW1 is operated; and 4, is a well-known photographing optical system (Lens), a part of which includes a shift lens (Shift) 5, a shutter (SH) 12 and the like that are parts of the image blur prevention system.

Reference numeral 6 denotes a motor (M) for moving the Lens 4 according to a measurement result of the distance measurement unit 2 to perform optical focus adjustment, and 7 and 8 denote vibration gyros (Gyro-Y and Gyro-P) attached to a camera main body in order to detect horizontal vibration and vertical vibration of the camera.

Figure 2:
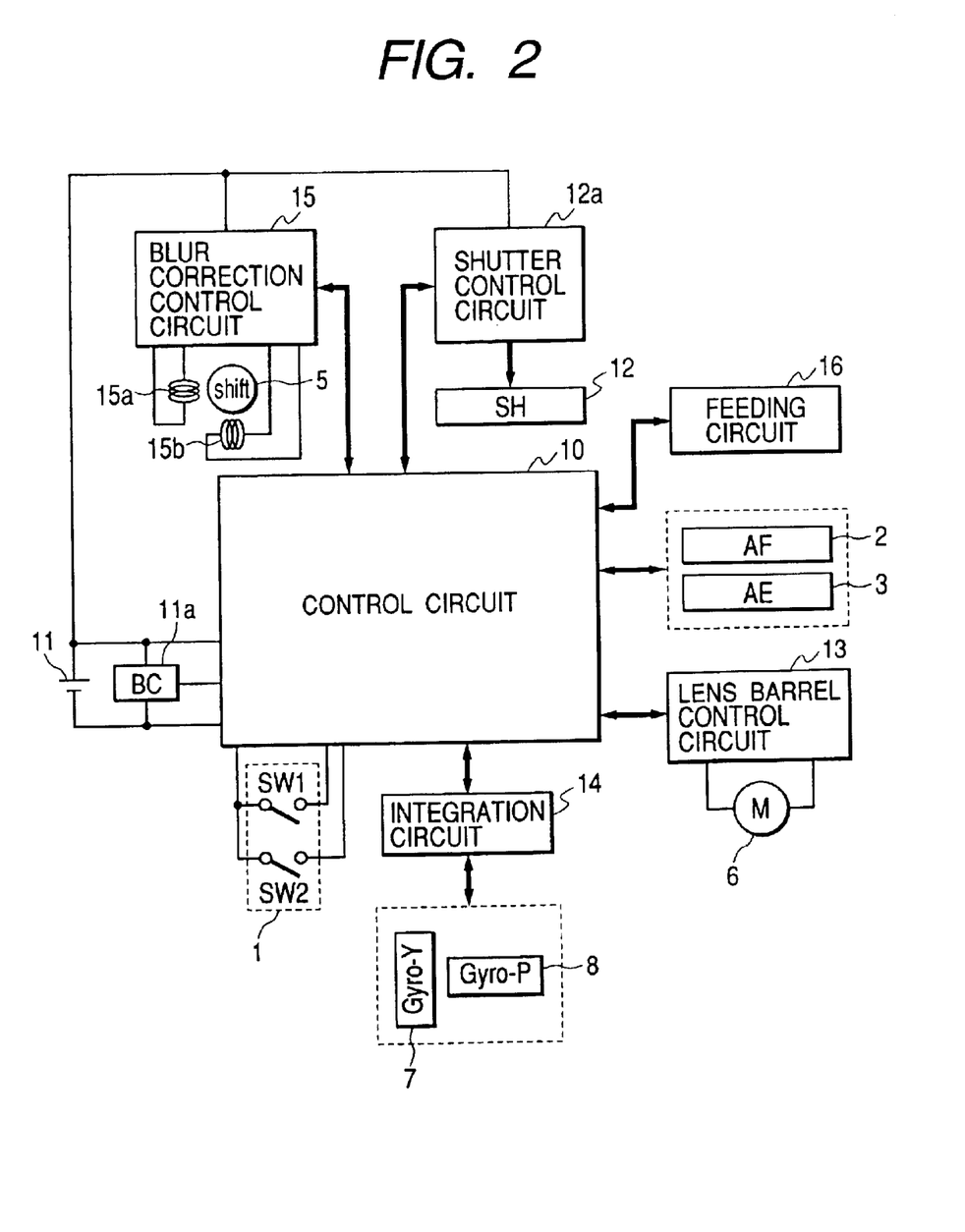
FIG. 2 is a block diagram showing an electric structure of the camera system of FIG. 1.

FIG. 2 is a block diagram showing a schematic electric structure of the camera with the above-mentioned structure. In the figure, the same parts as those in FIG. 1 are denoted by identical reference numerals, and the parts will not be described.

In the figure, reference numeral 10 denotes a control circuit for performing control of the camera; 11, a battery (VBAT) functioning as a base power supply of the camera; and 11a, a voltage detection circuit (BC) for detecting a residual voltage of the battery 11. Reference numeral 12 denotes a shutter (SH) disposed in a part of the Lens 4, and 12a denotes a shutter control circuit for applying predetermined control to the shutter 12 at a constant current.

Further, the shutter 12 is driven by the control circuit 10 and the shutter control circuit 12a at a constant current I1 (e.g., 400 mA) during fully opened time t1 (more accurately, time until bounding of a shutter blade stops and a fully opened state becomes stable; e.g., 10 msec) and is driven at a constant current I2 (e.g., 100 mA) during time t2 (e.g., 200 msec) until close energization is started after t1 as shown in FIG. 9. In the close energization, control for flowing a constant current I3 in an opposite direction for only predetermined time (e.g., −200 mA, 20 msec) to close the shutter is performed.

In addition, the shutter 12 and the shutter control circuit 12a are also used as loading means for energizing a predetermined current when the voltage detection circuit 11a performs a voltage detection operation, and energize a predetermined current in a shutter closing direction when they are used as the loading means.

Reference numeral 13 denotes a lens barrel control circuit for controlling the motor 6. Reference numeral 14 denotes an integration circuit for converting output signals (angular speed outputs) of a Gyro-Y7 and a Gyro-P8 into angular displacement. Reference numeral 15 denotes a blur correction control circuit for performing PWM energization to coils 15a and 15b based on vibration information obtained by the Gyro-Y7, Gyro-P8 and the integration circuit 14 to drive the Shift 5 in a blur correction direction.

The Gyro-Y7 and Gyro-P8, the integration circuit 14, the control circuit 10, the blur correction control circuit 15, the coils 15a and 15b, and the Shift 5 constitute the image blur prevention system in the first embodiment of the present invention.

Reference numeral 16 denotes a feeding circuit for performing winding-up control for one frame at a stage when an exposure operation applied to a not-shown film ends and performing rewinding operation when predetermined number of photographing ends.

Figure 3:
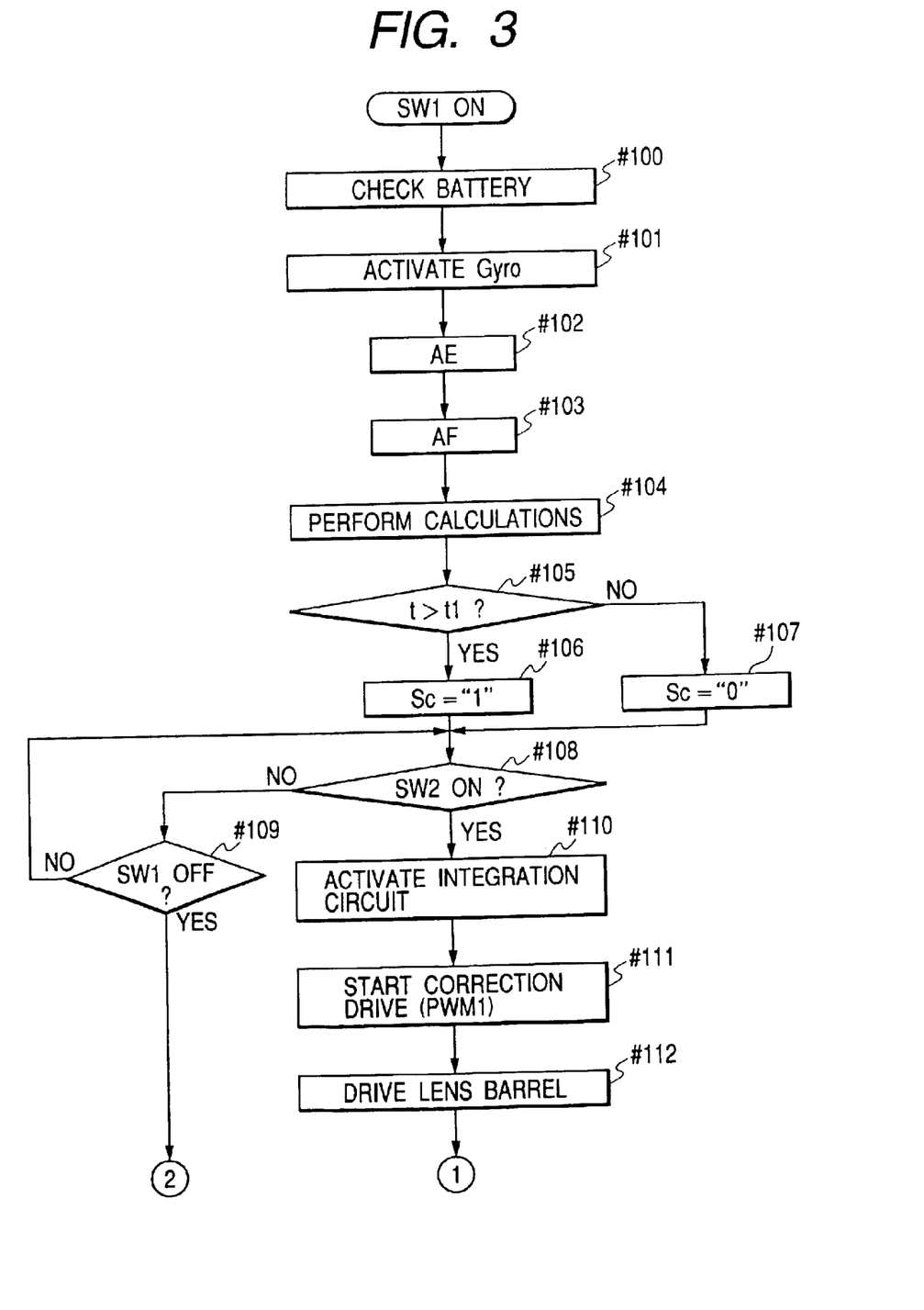
FIG. 3 is a flow chart showing operations of the camera system in the first embodiment of the present invention.
Figure 4:
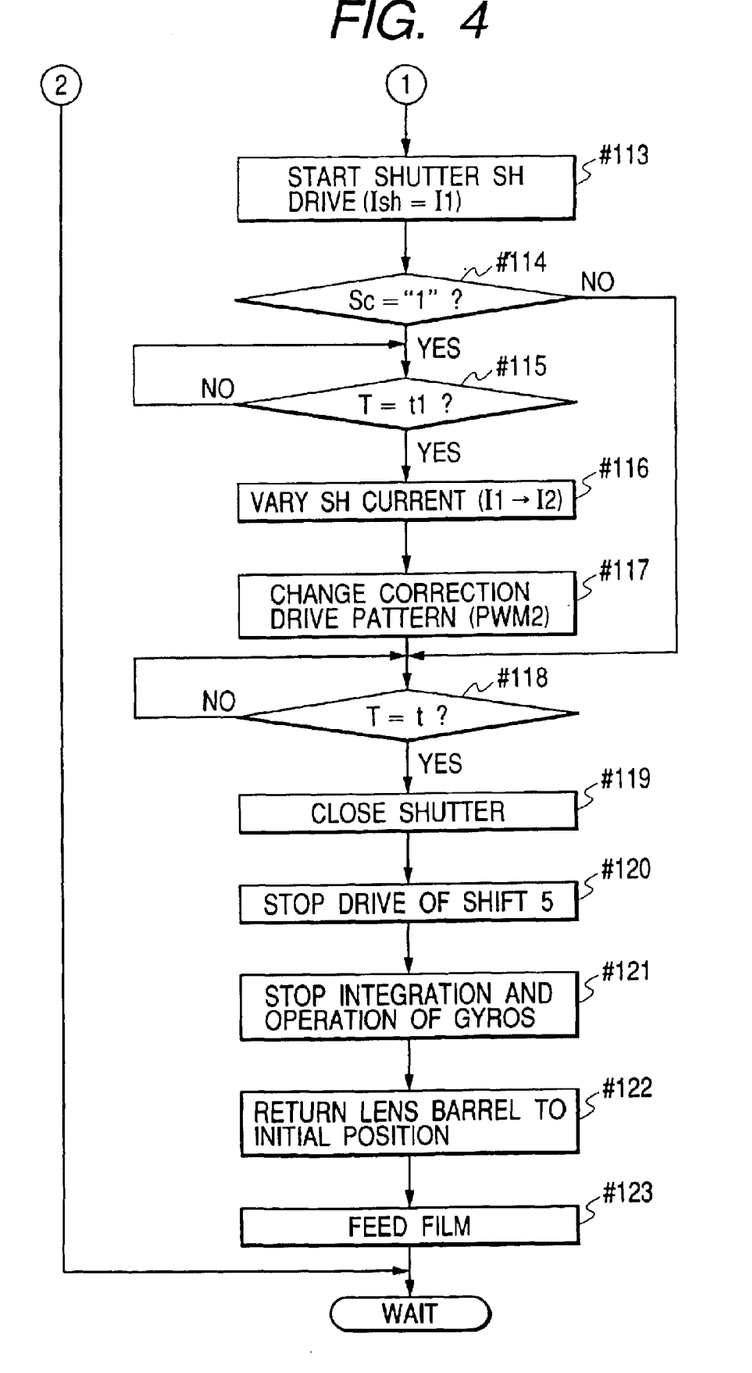
FIG. 4 is a flow chart showing a continuation of the operations of FIG. 3.

FIGS. 3 and 4 show a flow chart indicating an operation sequence in the control circuit 10 of the camera. When the switch SW1 is turned ON, the control circuit 10 starts operations from step #100.

First, in step #100, voltage detection of the battery 11 is performed by the voltage detection circuit 11a, and a result of voltage detection Vx is stored in a "BC area" that is a not-shown data memory area in the control circuit 10. In this step #100, before actuating the voltage detection circuit 11a, the shutter control circuit 12 is controlled to perform energization equivalent to the constant current I1 in a closing direction of the shutter 12 and perform voltage detection that takes into account a voltage drop amount at the time of actual shutter energization. That is, in step #100, the shutter 12 is used as loading means at the time of actuation of the voltage detection circuit 11a.

In the next step #101, power supply to the Gyro-Y7 and Gyro-P8 is performed to bring them into an actuated state. Then, in step #102, a well-known light measurement operation is performed by the light measurement unit 3 and, in the subsequent step #103, a well-known distance measurement operation is performed by the distance measurement unit 2. In the next step #104, calculation for deciding a focus adjustment position of an optical system and exposure time t (opening time of the shutter 12) is performed based on light measurement information and distance measurement information obtained in step #102 and step #103.

In step #105, it is judged whether or not the exposure time t decided in step #104 is longer than the shutter fully opened time t1 (see FIG. 9). If t>t1, the processing advances to step #106 to set "1" in a current variable flag area Sc in a not-shown data area in the control circuit 10. On the other hand, if not t>t1, the processing advances to step #107 to set "0" in the current variable flag area Sc in the not-shown data area in the control circuit 10.

In the next step #108, it is checked whether or not the switch SW2 is turned ON. If it is not turned ON, the processing advances to step #109, where it is checked whether or not the switch SW1 is turned OFF. If it is not turned OFF, the processing returns to step #108. If it is turned OFF, this sequence ends and the control circuit 10 enters a standby state for the next operation.

In addition, if it is judged in step #108 that the switch SW2 is turned ON, the processing advances to step #110, where the integration circuit 14 is driven and output signals (angular speed signals) of the already actuated Gyro-Y7 and Gyro-P8 are sent to the control circuit 10 as signals converted into angular displacement. Then, in the next step #111, the blur correction control circuit 15 is controlled based on an integration operation started in step #110 to start driving of so-called Shift 5 by energizing the coils 15a and 15b. A drive pattern of the Shift 5 is defined as PWM control =PWM1 that uses a coefficient based on the result of voltage detection Vx recognized in step #100.

Figure 5:
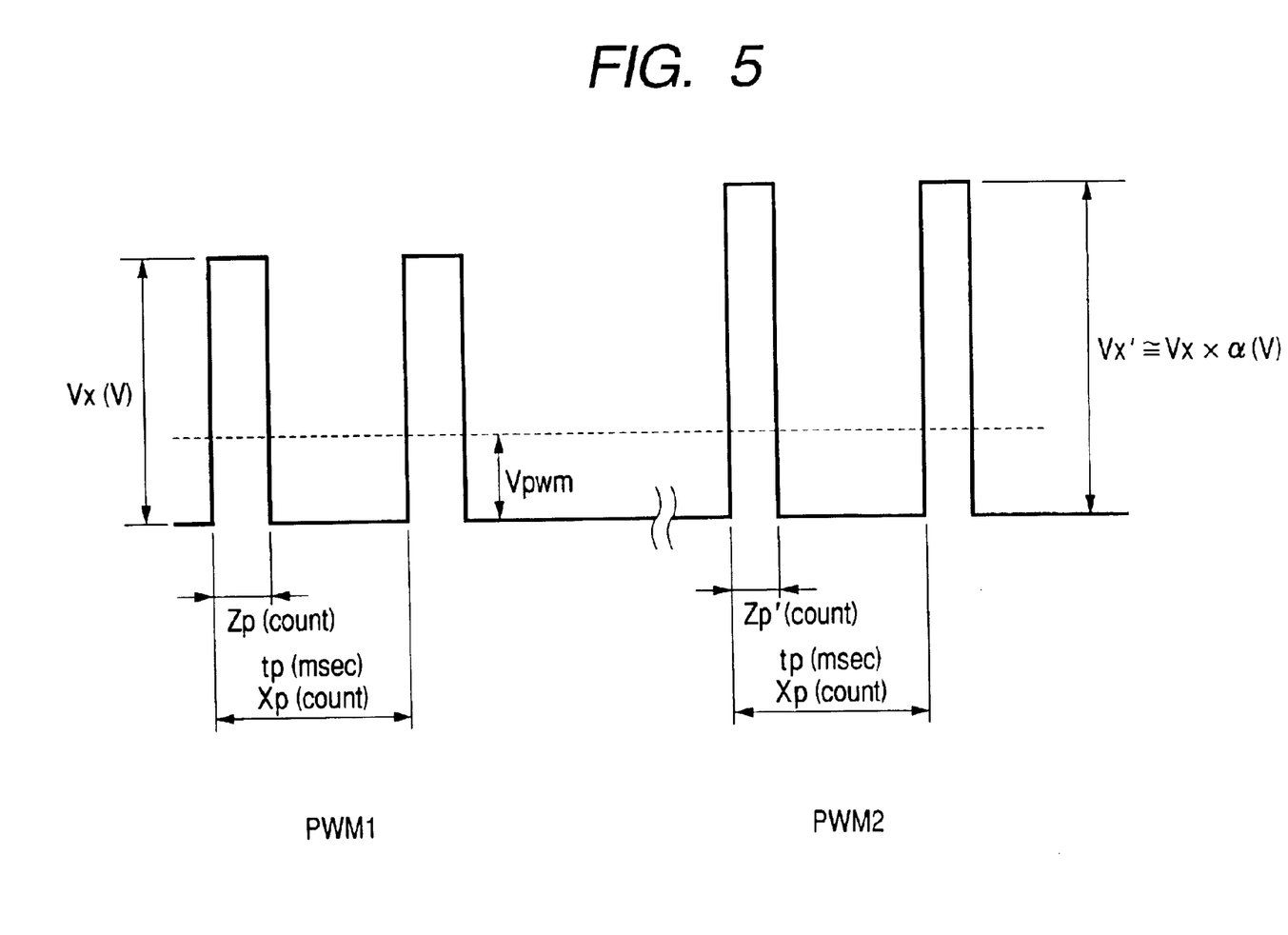
FIG. 5 is a chart showing an example of drive pattern change of an image blur prevention system (shift lens) in the first embodiment of the present invention.

For example, as shown in PWM1 in FIG. 5, the drive pattern PWM1 is controlled as the PWM count control Zp (count) for realizing a desired drive voltage Vpwm (V) based on a resolution Xp (count) of PWM and the result of voltage detection Vx(V) as indicated by the following expression (in the case in which one cycle time tp (msec) of PWM is fixed).

$$Zp = Vpwm/Vx \times Xp$$

In the next step #112, the motor 6 functioning as a drive source is rotated using the lens barrel control circuit 13 to move the photographing optical system Lens 4 to the focus adjustment position found in step #104. In the subsequent step #113 of FIG. 4, open energization control of the shutter 12 is started by the shutter control circuit 12a based on the exposure time found in step #104 and, at the same time, counting of a not-shown timer T in the control circuit 10 is started. In step #113, an energization current to the shutter 12 is I1.

In the next step #114, it is judged whether or not the current variable flag area Sc in the not-shown data area in the control circuit 10 is "1". If not Sc="1", the processing immediately advances to step #118. However, if Sc="1", the processing advances to step #115, where it is judged whether or not the timer T for which counting was started in step #113 has reached the shutter fully opened time t1. If it has not reached t1, step #115 is repeated until it reaches t1. Thereafter, when the timer T has reached t1, the processing advances to step #116.

When the processing advances to step #116, a current energizing the shutter 12 is varied from I1 to the shutter holding current I2 (see FIG. 9) by the shutter control circuit 12a. That is, in step #116, consuming energy of the shutter 12 functioning as an actuator is varied. Note that the relationship between I1 and I2 is "I1>I2".

In the next step #117, a drive pattern PWM1 of the Shift 5 started in step #111 is changed to a drive pattern PWM2 following a variation in a shutter energization current. Since an energization current of the shutter 12 decreases from I1 to I2, Vx is multiplied by a coefficient α (α>1) and a usable level Vx' of an increasing power supply voltage is virtually set as the drive pattern PWM2. The control circuit of FIG. 2 is for storing this coefficient.

For example, as shown in PMW2 in FIG. 5, the drive pattern PWM2 is controlled as the PWM count control Zp' (count) for realizing a desired drive voltage Vpwm (V) based on a resolution Xp (count) of PWM and the result of voltage detection Vx' Vx×α(V) as indicated by the following expression (in the case in which one cycle time tp (msec) of PWM is fixed).

$$Zp'=Vpwm/(Vx\times\alpha)\times Xp$$

In step #118, it is judged whether or not the timer T for which counting was started in step #113 has reached the proper exposure time t. If it has not reached proper exposure time t, step #118 is repeated until it reaches t. Thereafter, when the timer T has reached t1, the processing advances to step #119, where shutter closing energization for predetermined time (t2) is performed by the shutter control circuit 12a.

Further, in the first embodiment, since the shutter closing energization current I3 (see FIG. 9) reversely energizes the same current as the shutter holding current I2 and there is no change if it is judged as consuming energy of the battery 11, an image blur prevention system drive pattern continues to be PWM2. However, if a shutter closing energization current were different from the shutter open current I1 and the shutter holding current I2 as an absolute value, a new PWM control pattern may be set.

In the next step #120, the blur correction control circuit 15 is controlled to stop the driving of the Shift 5. Then, in the next step #121, the power supply to the Gyro-Y7 and Gyro-P8 and the actuation of the integration circuit 14 are stopped. In the subsequent step #122, the lens barrel control circuit 13 is controlled and the photographing optical system Lens 4 is returned to its initial position. In the last step #123, feeding of one frame of a film is performed by the feeding circuit 16, and the control circuit 10 enters a standby state for the next operation.

The above is the operation sequence of the control circuit 10 of a camera in the first embodiment of the present invention.

Figure 6:
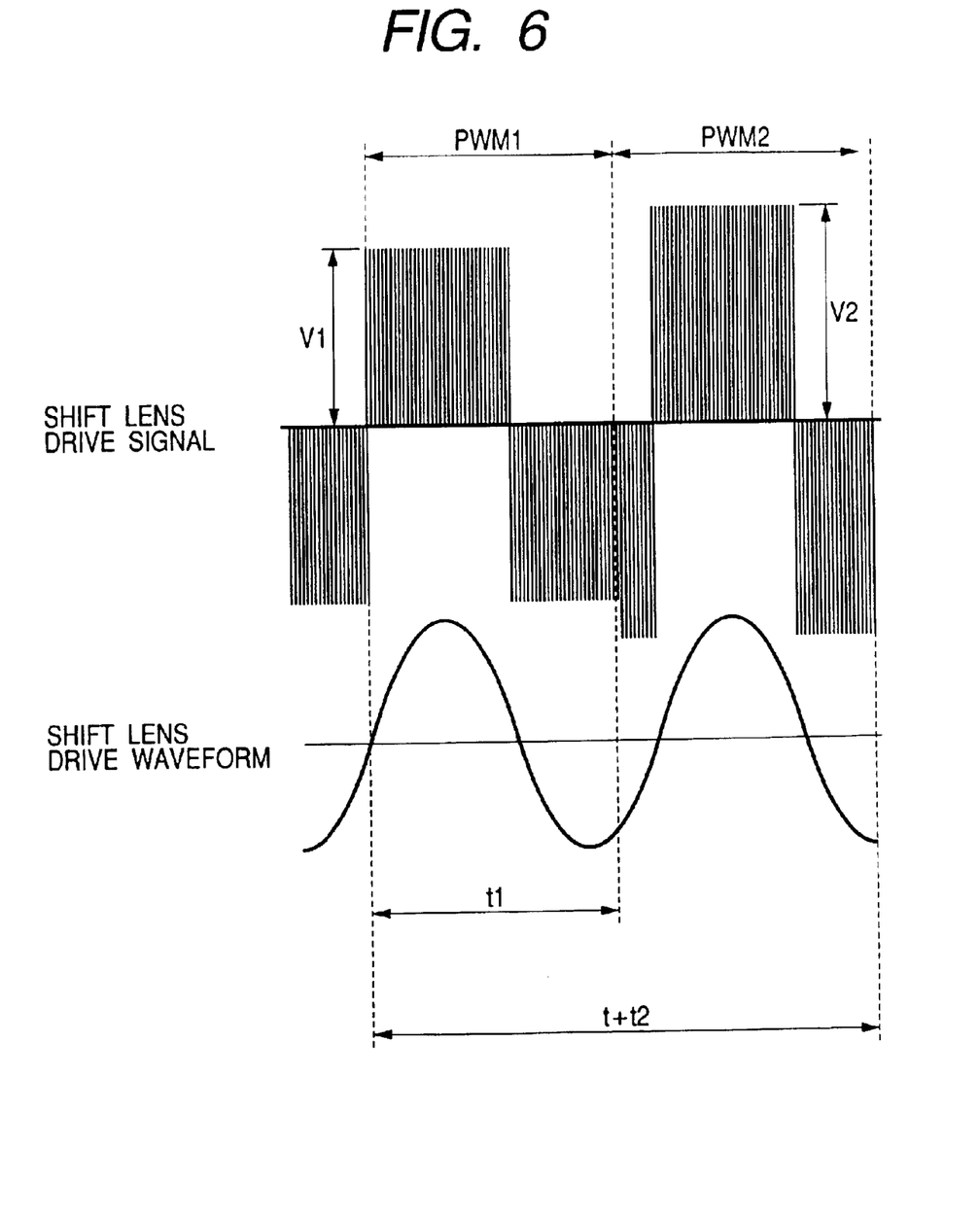
FIG. 6 is a chart showing another example of drive pattern change of the image blur prevention system (shift lens) in the first embodiment of the present invention.

FIG. 6 shows an example of an operation including a drive pattern change of an image blur prevention system (shift lens) based on the operation sequence of the camera in the first embodiment.

FIG. 6 is a chart of a drive signal (assumed to be a signal energizing a coil 15-1) for driving the Shift 5 and a drive waveform with which the Shift 5 is driven in the case in which a predetermined sine wave vibration is applied to the camera (it is assumed that vibration is applied such that a signal is generated in the Gyro-Y7).

In step #113, as described in step #111, the blur prevention system is driven with the drive pattern PWM1 (drive pattern based on a voltage detection result Vx) during time t1 from the start of opening of the shutter 12 until full opening of the shutter 12 is stabilized.

Thereafter, since the energization current to the shutter 12 is varied from I1 to I2 during time ((t−t1)+t2) after the full opening of the shutter 12 is stabilized until the end of exposure, the drive voltage of the Shift 5 changes to V2. Thus, the drive pattern of the Shift 5 is changed to PWM2.

As it is seen from FIG. 6, the drive pattern of the Shift 5 is changed from PWM1 to PWM2 in response to switching the energization current to the shutter 12 from I1 to I2, whereby it becomes possible to perform stable driving of the image blur prevention system (shift lens) and to realize a desired image blur prevention effect.

Note that, although an optical electronic apparatus has been described with a silver salt camera as an example of the first embodiment, the present invention is not limited to this. For example, the present invention can also be applied to a digital camera or the like which is provided with an image blur prevention function and uses a sensor such as a CCD.

It is also based on the spirit of the present invention to change a drive pattern (PWM reference) of the image blur prevention system in the case in which consuming energy for driving an actuator such as a shutter is varied at the time of accumulating image signals that actuates the image blur prevention system.

Further, the actuator is not limited to a shutter. For example, in a digital camera, a usable voltage of the image blur prevention system also varies in such a case in which ON (display)/OFF of a display monitor (liquid crystal display) changes or in which ON (display)/OFF of a back light of a display monitor (liquid crystal display) changes. Thus, changing a drive pattern based on such changes corresponding to a variation in "consuming energy of the actuator" as in the case of a shutter can be performed.

In addition, in the first embodiment of the present invention, a drive pattern of the image blur prevention system to be changed is set such that an energizing time count Zp (count) changes in a state in which PWM cycle time tp (msec) is fixed. However, the present invention is not limited to this. For example, it is also based on the spirit of the prevent invention to, for example, "change the PWM cycle time tp before or after a variation in consuming energy of the actuator".

Moreover, in the first embodiment, a drive pattern of the image blur prevention system is found by calculation. However, the present invention is not limited to this. For example, it is also in conformity with the spirit of the present invention to use a method of providing a basic table of drive patterns to change selected data according to a voltage.

Second Embodiment

In the first embodiment, voltage detection by the voltage detection circuit 11a is performed only in an energizing state of a current equivalent to a constant current I1 to the shutter 12 functioning as loading means.

However, in the above-mentioned sequence, although voltage detection time itself can be reduced, variation in a power supply voltage with respect to variation in a consumed current is estimated. Thus, it becomes extremely difficult to take into account influence of an internal impedance of a battery which changes according to an environmental temperature or a voltage residual amount.

Therefore, in a second embodiment of the present invention, a plural number of times of voltage detection using varied loads are performed by the voltage detection circuit to set or change a drive pattern of an image blur prevention system based on a result of the detection.

The second embodiment of the present invention will be described with reference to the flow chart of FIGS. 7 and 8. Note that, since a system configuration in the second embodiment is the same as that in the first embodiment, descriptions of the system configuration will be left out.

Figure 7:
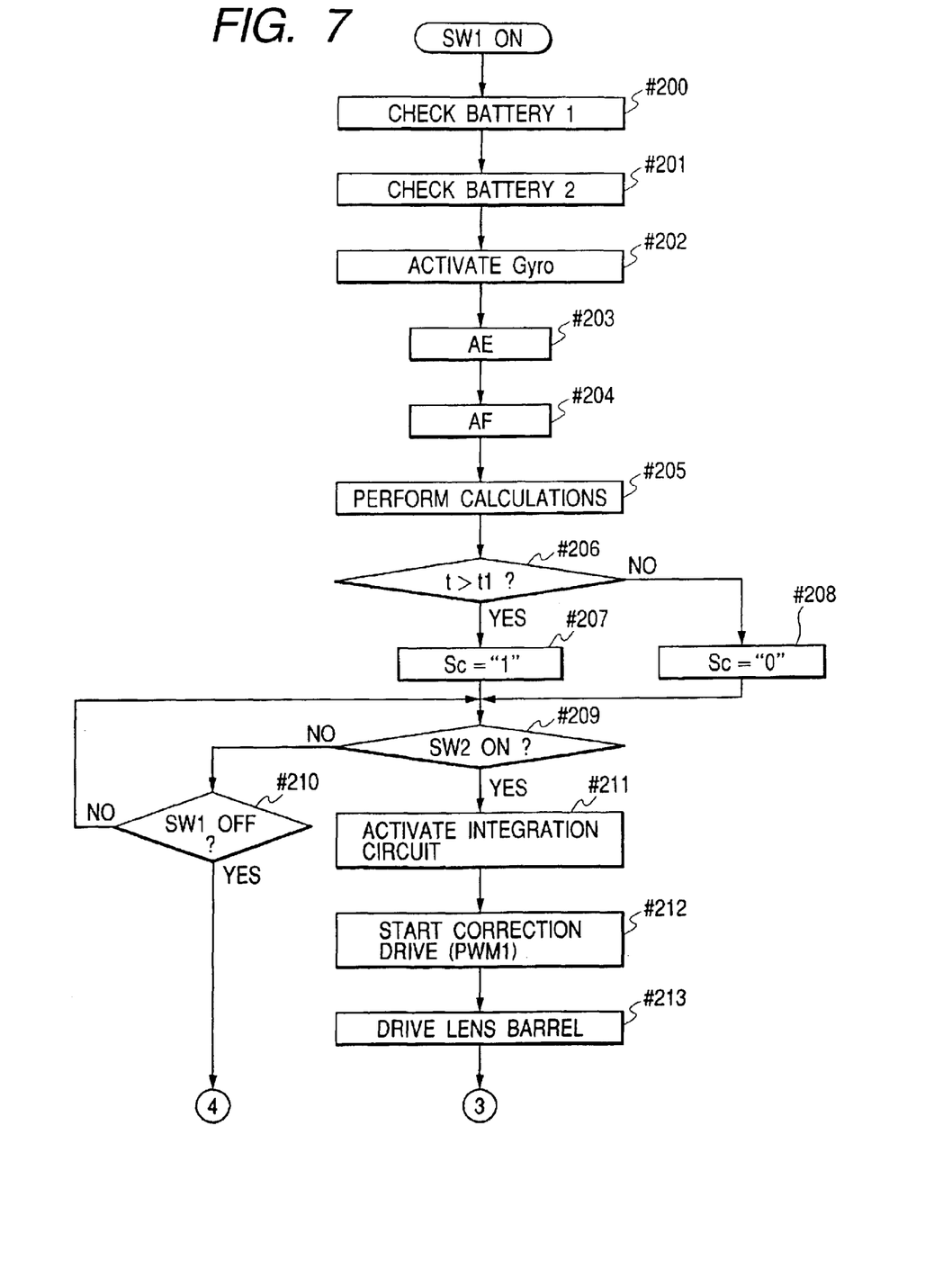
FIG. 7 is a flow chart showing operations of a camera system in a second embodiment of the present invention.
Figure 8:
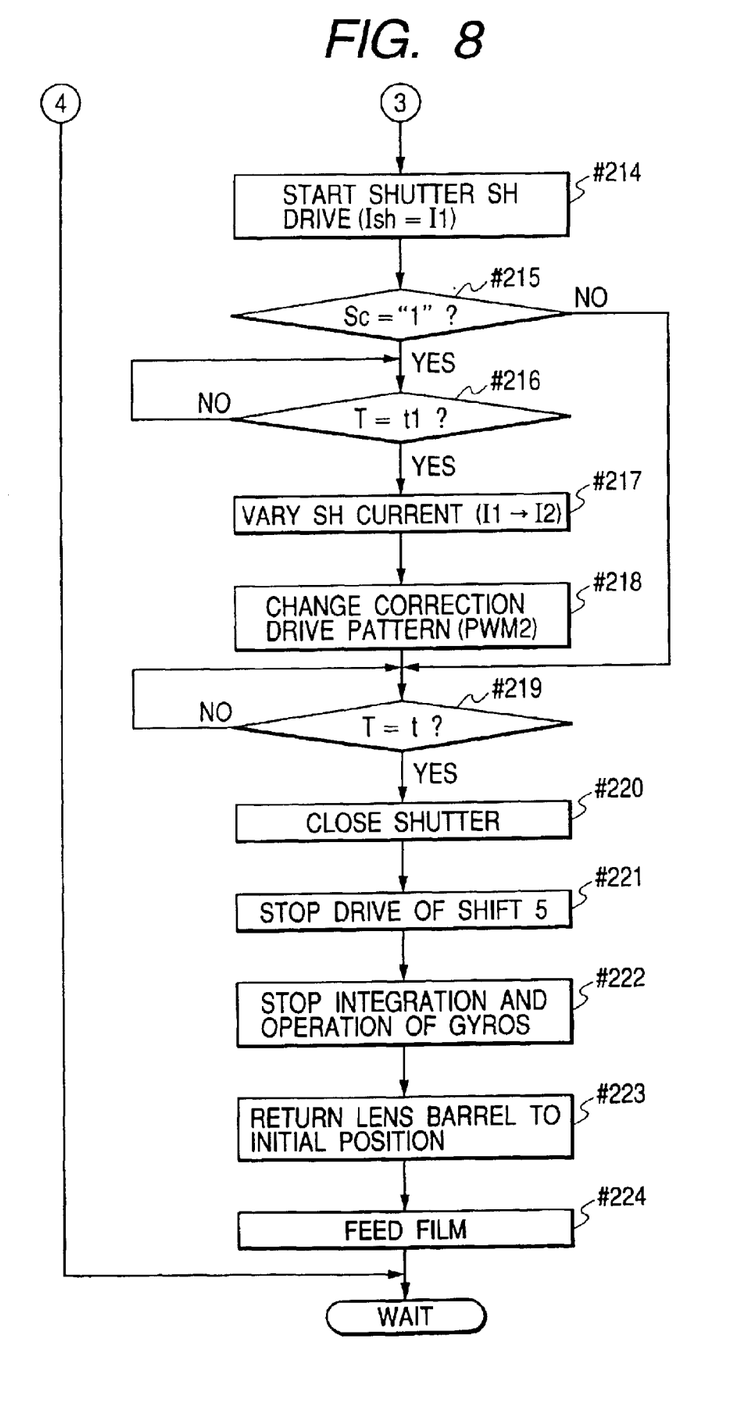
FIG. 8 is a flow chart showing a continuation of the operations of FIG. 7.

FIGS. 7 and 8 show a flow chart indicating an operation sequence in the control circuit 10 of a camera in accordance with a second embodiment of the present invention. When the switch SW1 is turned ON, the control circuit 10 starts operations from step #200.

First, in step #200, voltage detection of the battery 11 is performed by the voltage detection circuit 11a, and a result of voltage detection Vx1 is stored in a "BC area 1" that is a not-shown data memory area in the control circuit 10. In this step #200, before actuating the voltage detection circuit 11a, the shutter control circuit 12 is controlled to perform energization equivalent to the constant current I1 (e.g., 400 mA) in a closing direction of the shutter 12 and perform voltage detection that takes into account a voltage drop amount at the time of actual shutter energization. That is, in step #200, the shutter 12 is used as loading means at the time of actuation of the voltage detection circuit 11a.

In the next step #201, voltage detection of the battery 11 is performed by the voltage detection circuit 11a and a result of voltage detection V×2 is stored in a "BC area 2" that is a not-shown data memory area in the control circuit 10 as in step #200. However, in step #201, voltage detection is performed taking into account a voltage drop amount at the time of energization with a load different from that in step #200 while load energization (e.g., equivalent to the constant current I2 (e.g., 100 mA)) that is different from shutter closing energization in step #200 is performed. That is, in step #200 and step #201, a plural times of voltage detection with different loads are performed, and a result of detection is stored in a not-shown data memory area.

In the next step #202, power supply to the Gyro-Y7 and Gyro-P8 is performed to bring them into an actuated state. Then, in step #203, a well-known light measurement operation is performed by the light measurement circuit 3 and, in the subsequent step #204, a well-known distance measurement operation is performed by the distance measurement circuit 2. In the next step #205, calculation for deciding a focus adjustment position of an optical system and exposure time t (opening time of the shutter 12) is performed based on light measurement information and distance measurement information obtained in step #203 and step #204.

In step #206, it is judged whether or not the exposure time t decided in step #205 is longer than the shutter fully opened time t1. If t>t1, the processing advances to step #207 to set "1" in a current variable flag area Sc in a not-shown data area in the control circuit 10. On the other hand, if not t>t1, the processing advances to step #208 to set "0" in the current variable flag area Sc in the not-shown data area in the control circuit 10.

In the next step #209, it is checked whether or not the switch SW2 is turned ON. If it is not turned ON, the processing advances to step #210, where it is checked whether or not the switch SW1 is turned OFF. If it is not turned OFF, the processing returns to step #209. If it is turned OFF, this sequence ends and the control circuit 10 enters a standby state for the next operation.

In addition, if it is judged in step #209 that the switch SW2 is turned ON, the processing advances to step #211, where the integration circuit 14 is driven and output signals (angular speed signals) of the already actuated Gyro-Y7 and Gyro-P8 are sent to the control circuit 10 as signals converted into angular displacement. Then, in the next step #212, the blur correction control circuit 15 is controlled based on an integration operation started in step #211 to start driving of so-called Shift 5 by energizing the coils 15a and 15b. A drive pattern of the Shift 5 is defined as PWM control=PWM1 that uses a coefficient based on the result of voltage detection V×1 recognized in step #200.

For example, the drive pattern PWM1 is controlled as the PWM count control Zp (count) for realizing a desired drive voltage Vpwm (V) based on a resolution Xp (count) of PWM and the result of voltage detection V×1 (V) as indicated by the following expression (in the case in which one cycle time tp (msec) of PWM is fixed).

$$Zp = Vpwm/Vxq \times Xp$$

In the next step #213, the motor 6 functioning as a drive source is rotated using the lens barrel control circuit 13 to move the photographing optical system Lens 4 to the focus adjustment position found in step #205. In the subsequent step #214 of FIG. 8, open energization control of the shutter 12 is started by the shutter control circuit 12a based on the exposure time found in step #205 and, at the same time, counting of a not-shown timer T in the control circuit 10 is started. In step #214, an energization current to the shutter 12 is I1.

In step #215, it is judged whether or not the current variable flag area Sc in the not-shown data area in the control circuit 10 is "1". If not Sc="1", the processing immediately advances to step #219. However, if Sc="I1", the processing advances to step #216, where it is judged whether or not the timer T for which counting was started in step #214 has reached the shutter fully opened time t1. If it has not reached t1, step #216 is repeated until it reaches t1. Thereafter, when the timer T has reached t1, the processing advances to step #217, where a current energizing the shutter 12 is varied from I1 to the shutter holding current I2 by the shutter control circuit 12a. That is, in step #217, consuming energy of the shutter 12 functioning as an actuator is varied. Note that the relationship between I1 and I2 is "I1>I2".

In the next step #218, the drive pattern PWM1 of the Shift 5 started in step #212 is changed to PWM control=PWM2 that uses a coefficient based on the result of voltage detection V×2 recognized in step #201 following the variation in the shutter energization current.

For example, the drive pattern PWM2 is controlled as the PWM count control Zp (count) for realizing a desired drive voltage Vpwm (V) based on a resolution Xp (count) of PWM and the result of voltage detection V×2 (V) as indicated by the following expression (in the case in which one cycle time tp (msec) of PWM is fixed).

$$Zp = Vpwm/V \times 2 \times Xp$$

In step #219, it is judged whether or not the timer T for which counting was started in step #214 has reached the proper exposure time t. If it has not reached t, step #219 is repeated until it reaches t. Thereafter, when the timer T has reached t1, the processing advances to step #220, where shutter closing energization for predetermined time (t2) is performed by the shutter control circuit 12a.

Further, in the second embodiment, since the shutter closing energization current I3 reversely energizes the same current as the shutter holding current I2 and there is no change if it is judged as consuming energy of the battery 11, an image blur prevention system drive pattern continues to be PWM2. However, if a shutter closing energization current were different from the shutter open current I1 and the shutter holding current I2 as an absolute value, a new PWM control pattern may be set.

In the next step #221, the blur correction control circuit 15 is controlled to stop the driving of the shift 5. Then, in the next step #222, the power supply to the Gyro-Y7 and Gyro-P8 and the actuation of the integration circuit 14 is stopped. In the subsequent step #223, the lens barrel control circuit 13 is controlled and the photographing optical system Lens 4 is returned to its initial position. In the last step #224, feeding of one frame of a film is performed by the feeding circuit 16, and the control circuit 10 enters a standby state for the next operation.

The above is the operation sequence of the control circuit 10 of a camera in the second embodiment of the present invention.

Further, the loading means is described as a single shutter circuit in the second embodiment. However, the present invention is not limited to this. For example, there is no problem if a method provided with a plurality of loading means is used such as a method of "using a shutter and a red-eye reduction lamp (not shown) as loads in performing a first voltage detection and using only the shutter as a load in performing a second voltage detection".

In addition, it is also based on the spirit of the present invention that a method of "performing a first voltage detection without performing load energization and applying load energization to a shutter at a second voltage detection" is used or magnitudes of amounts of the first and second load energization are opposite.

According to each embodiment described above, if consuming energy of another actuator such as a shutter is varied during driving of an image blur prevention system, it becomes possible to realize a desired blur prevention effect by changing a drive pattern of the image blur prevention system before or after a variation in the consuming energy of the another actuator even if an energy saving operation required for miniaturization is performed. In addition, a shutter for controlling exposure is used as another actuator as described above, which is effective for an optical electronic apparatus with high necessity of a blur prevention function and an energy saving operation such as a camera.

Further, as in the second embodiment, voltage detection operations with different loads are performed for a plural number of times to change a drive pattern of an image blur prevention system based on a result of the plural number of times of voltage detection, a resolution of PWM and a desired drive voltage of the image blur prevention system. Consequently, a camera with high controllability can be realized without decreasing a blur prevention effect while being based on an energy saving operation.

Note that, although each of the above-mentioned embodiments are described with a silver salt camera as an example, the present invention may be applied to an optical electronic apparatus such as a digital camera for still images.

As described above, according to the present invention, an optical electronic apparatus equipped with a blur prevention function can be provided which is capable of realizing a desired blur prevention effect even if an energy saving operation required for miniaturization is performed.

What is claimed is:

1. An apparatus provided with an image blur prevention function, comprising:
    a blur correction driving means for performing correction of image blur;
    an actuator separate from said blur correction driving means, consuming energy of said actuator changing depending on time;
    a power supply for supplying energy to said blur correction driving means and said actuator; and
    a variable circuit for changing an energy supply pattern in supplying energy to said blur correction driving means by said power supply before or after consuming energy of said actuator changes.

2. An apparatus according to claim 1,
    wherein said blur correction driving means is controlled to be driven by pulse width modulation control and said variable circuit changes a pulse width.

3. An apparatus according to claim 1,
    wherein said actuator is controlled by variation in current of said power supply.

4. An apparatus according to claim 3, further comprising:
    an image receiving medium for receiving a subject image; and
    a shutter member for changing an amount of light reaching said image receiving medium,
    wherein said actuator corresponds to said shutter member.

5. An apparatus according to claim 1, further comprising optical means for forming an optical image of a subject,
    wherein said blur correction driving means drives at least a part of optical units constituting said optical means.

6. An apparatus according to claim 1, further comprising a voltage detection circuit for detecting a voltage of said power supply,
    wherein said voltage detection circuit detects a voltage in a state in which energy is supplied to said actuator.

7. A camera provided with an image blur prevention function, comprising:
    a lens driving member for driving a lens unit to a direction perpendicular to an optical axis of a photographing lens in order to correct image blur;
    an actuator separate from said lens driving member, consuming energy of said actuator changing depending on time;
    a power supply for supplying energy to said lens driving member and said actuator; and
    a variable circuit for changing an energy supply pattern in supplying energy to said lens driving means by said power supply before or after consuming energy of said actuator changes.

8. A camera according to claim 7,
    wherein said lens driving member is controlled to be driven by pulse width modulation control and said variable circuit changes a pulse width.

9. A camera according to claim 7,
    wherein said actuator is controlled by variation in current of said power supply.

10. A camera according to claim 9, further comprising:
    an image receiving medium for receiving a subject image; and
    a shutter member for changing an amount of light reaching said image receiving medium,
    wherein said actuator corresponds to said shutter member.

* * * * *

UNITED STATES PATENT AND TRADEMARK OFFICE
CERTIFICATE OF CORRECTION

PATENT NO.    : 6,728,481 B2  Page 1 of 1
DATED         : April 27, 2004
INVENTOR(S)   : Toshiharu Ueda et al.

It is certified that error appears in the above-identified patent and that said Letters Patent is hereby corrected as shown below:

<u>Column 6,</u>
Line 54, delete "I1>12" and insert -- I1>I2 --.

<u>Column 7,</u>
Line 58, delete "I1" and insert -- I1 --.

<u>Column 10,</u>
Line 8, delete "Sc="I1"" and insert -- Sc="1" --.

Signed and Sealed this

Twenty-first Day of March, 2006

JON W. DUDAS
*Director of the United States Patent and Trademark Office*